March 16, 1937. W. W. CRILEY 2,074,104
BLANK TURNING AND TRANSFER MECHANISM
Filed Sept. 13, 1933 4 Sheets-Sheet 1
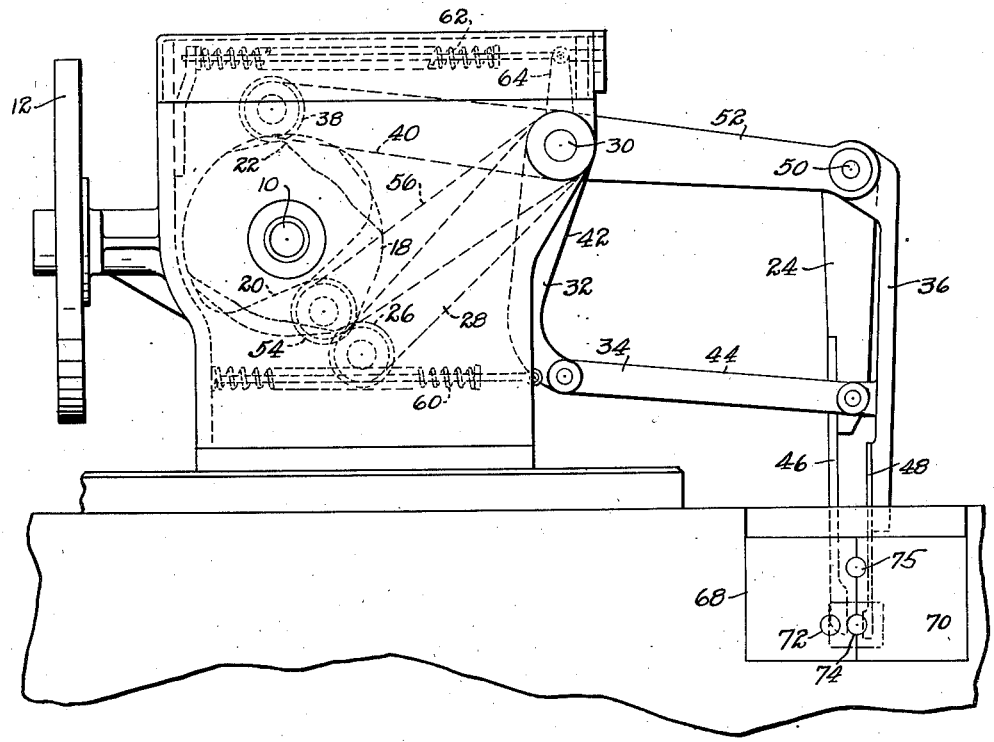
Fig.1
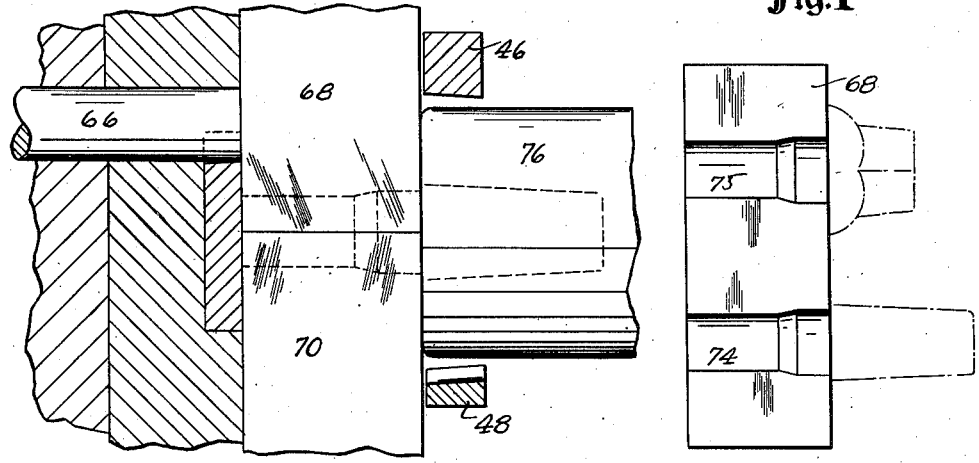
Fig.4
Fig.5
INVENTOR
William W. Criley.
BY
Justin W. Macklin,
ATTORNEY March 16, 1937.  W. W. CRILEY  2,074,104
BLANK TURNING AND TRANSFER MECHANISM
Filed Sept. 13, 1933  4 Sheets-Sheet 2

INVENTOR
William W. Criley,
BY Justin W. Macklin,
ATTORNEY

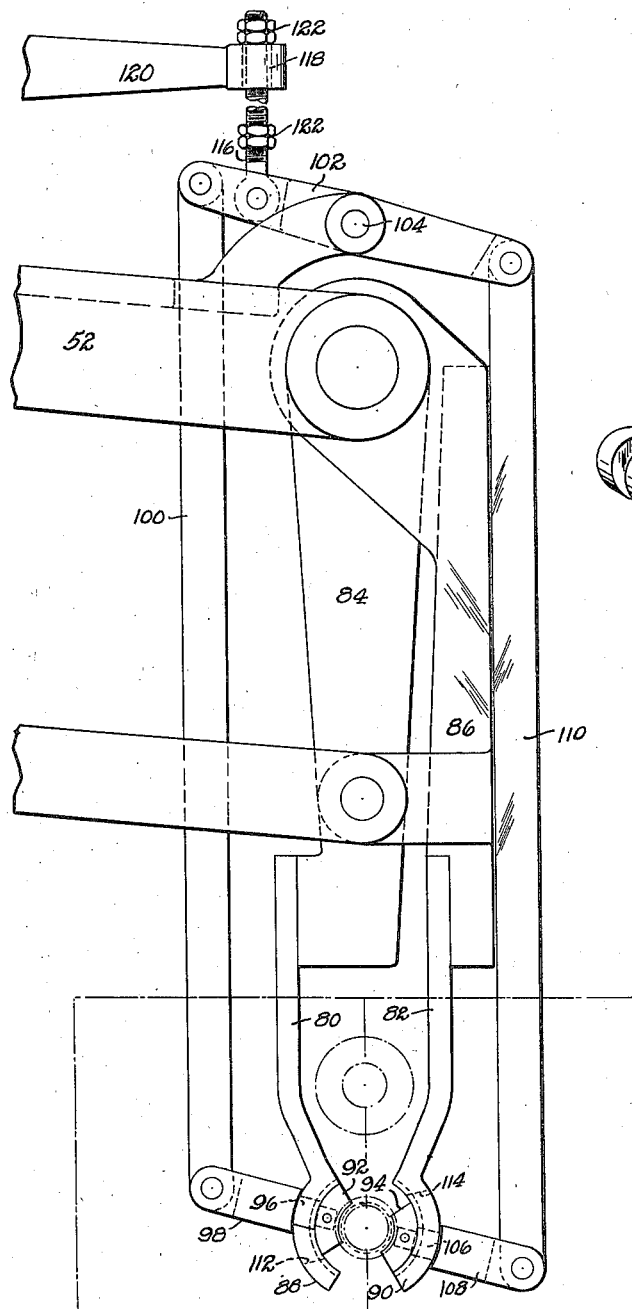

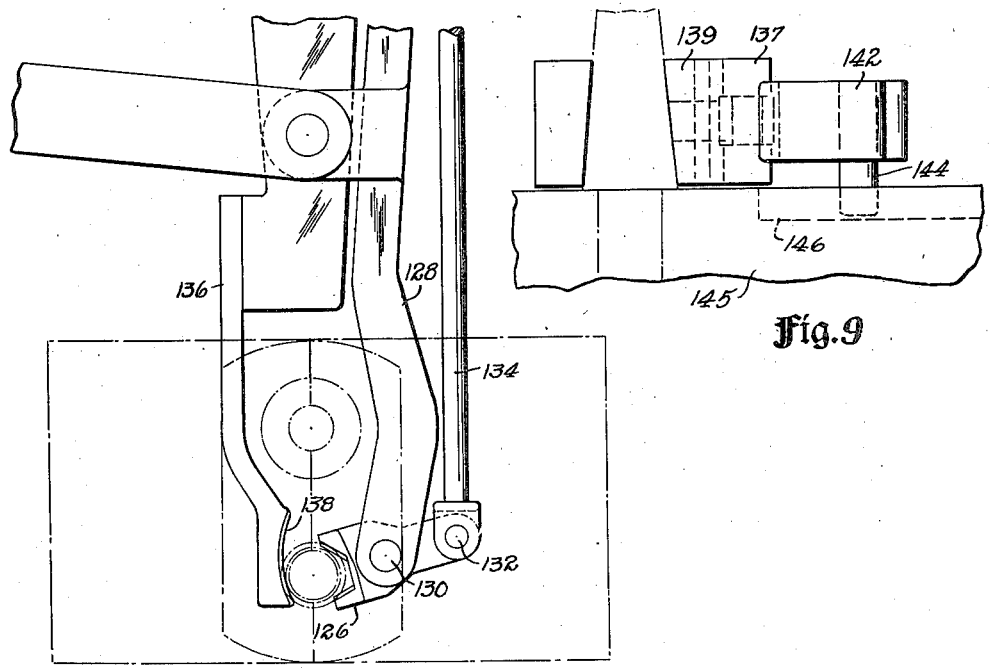
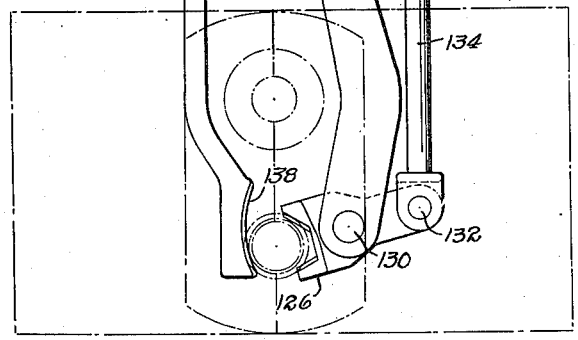
Fig.9
Fig.8
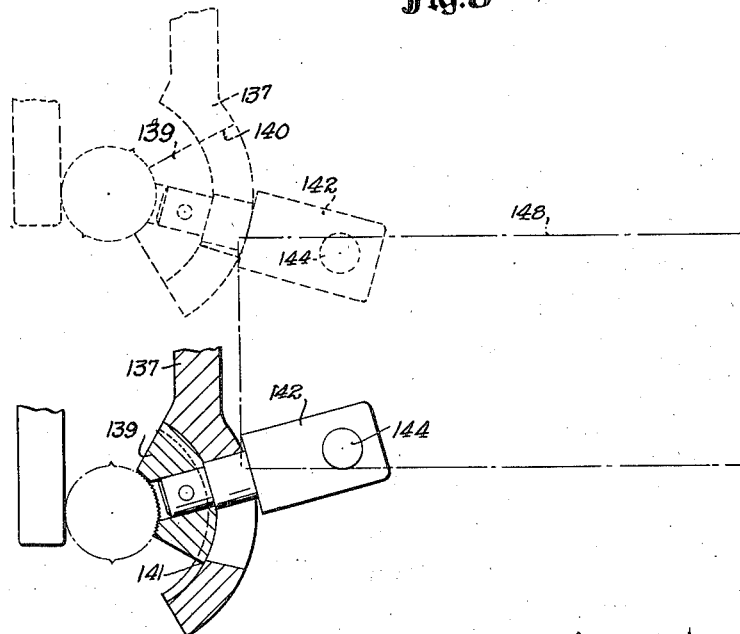
Fig.10

Patented Mar. 16, 1937

2,074,104

UNITED STATES PATENT OFFICE 2,074,104

BLANK TURNING AND TRANSFER MECHANISM

William W. Criley, Cleveland, Ohio

Application September 13, 1933, Serial No. 689,227

11 Claims. (Cl. 10—12)

This invention relates to a blank turning and transfer mechanism for use in connection with upsetting or forging machines, or other machines of like character.

It is a general object of the invention to provide a mechanism for transferring blanks between successive stages of forging or upsetting operations and which will during transfer of the blank cause it to be turned or rotated so as to prevent the formation of fins or other extruded portions on the blank.

Another principal object is to provide a transfer mechanism adapted to operate in a space between gripper dies and a heading tool to transfer blanks between successive work stations by gripping the upset portion of the blank. Such a transfer mechanism is particularly applicable in the manufacture of relatively short forged or upset articles.

A yet further object is to provide a transfer mechanism having transfer fingers arranged so as to permit the movement of a heading tool therebetween while the transfer fingers are returning from the transfer of a blank between work stations.

Another object of this invention is to provide transfer fingers having blank turning jaws or lugs associated therewith adapted to turn a blank about its center, or to move the blank through a short arcuate path, during transfer of the blank between adjacent work stations.

Other and more specific objects will be apparent from the following description which is illustrated in the attached drawings, in which—

Fig. 1 is an elevation of one form of transfer mechanism mounted on an upsetting machine.

Fig. 4 is a similar fragmentary enlarged view of transfer fingers in their open position to permit the passage therebetween of a heading tool.

Fig. 5 is a view of a gripper die diagrammatically illustrating a relatively short blank held therein.

Fig. 6 is an illustration of one form of blank turning mechanism that may be used in connection with transfer fingers.

Fig. 7 is an enlarged view of the blank turning jaws or lugs shown in Fig. 6.

Fig. 8 is another embodiment of a blank turning mechanism.

Fig. 9 is still another blank turning mechanism, and

Fig. 10 is a diagrammatic illustration of the action of the mechanism shown in Fig. 9.

Figure 2:
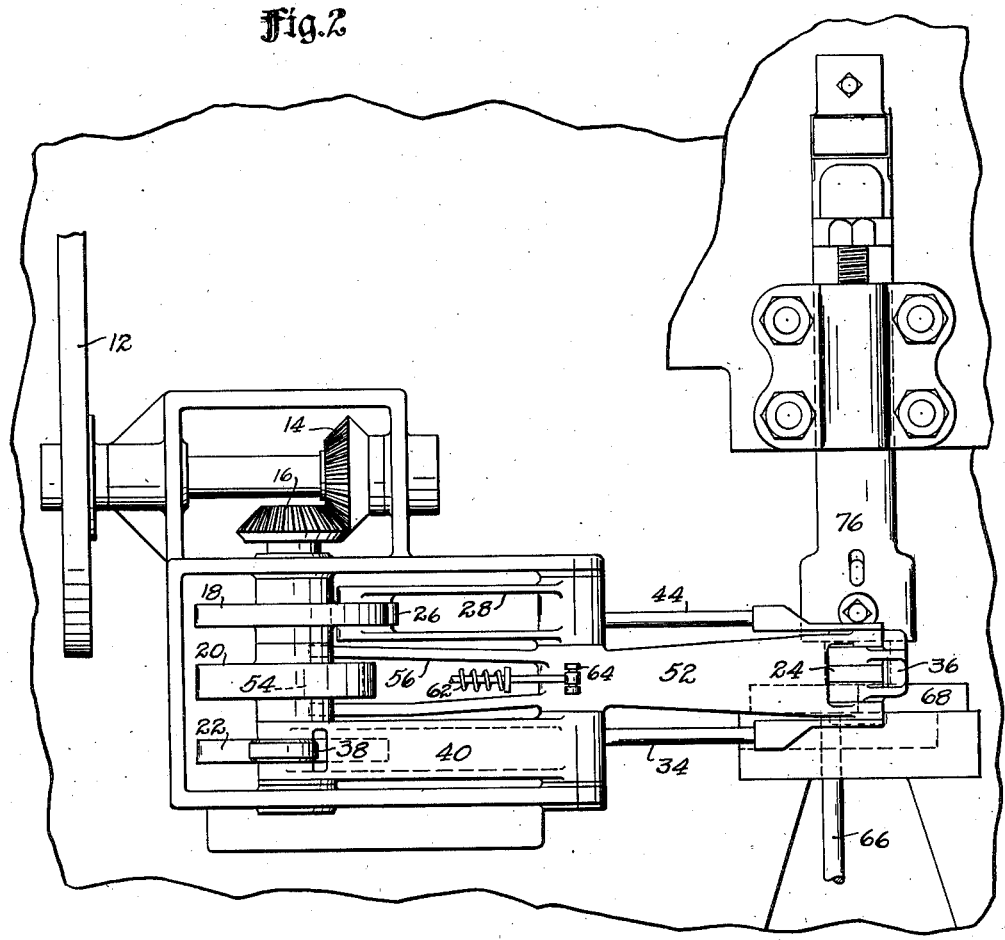
Fig. 2 is a plan view of the embodiment shown in Fig. 1.

Referring now to Figs. 1 and 2, there is shown a cam shaft 10 which may be driven from a pulley or sprocket wheel 12 through the bevel gears 14 and 16, as shown. Rigid with the cam shaft 10 are cams 18, 20 and 22. The cam 18 controls lateral movement of the finger supporting arm 24 through the roller 26 in the end of the arm 28, which arm is pivoted on the shaft 30 and has a downwardly extending arm 32 rigid therewith and connecting with the finger supporting arm 24 by a link 44.

The cam 22 controls lateral movement of the finger supporting arm 36 through a roller 38 in the end of an arm 40, also pivoted on the shaft 30 and likewise having a downwardly extending arm 42 rigid therewith and connecting with the finger supporting arm 36 by a link 34. The finger supporting arm 24 supports the transfer finger 46 while the finger supporting arm 36 supports the transfer finger 48. The two supporting arms 24 and 36 are mutually pivoted at 50 in the end of a raising and lowering arm 52 which is likewise pivoted on the shaft 30 and has a roller 54 on the end of a cam actuated arm 56 engaging the face of the raising and lowering cam 20.

The rollers 26 and 38 are held in engagement with their respective cams by action of separate tension springs indicated at 60 each having one end secured to the housing of the machine and each having its other end connected to a link pivotally connected to the downwardly extending levers or arms 32 and 42. Similarly, the roller 54 is held in engagement with the cam 20 by a similar spring 62 reacting against a counter arm 64 rigid with the lever arm 52.

Bar or rod stock 66 (Fig. 4) may be fed to gripper dies 68 and 70 and cut off to form work blanks, as is more fully described in my copending application for a Feeding and transfer mechanism, Serial No. 689,226. After a first upsetting or stock gathering operation which may be performed, the fingers 46 and 48 are actuated by their respective cams to grip the work piece to transfer it between successive die stages while the dies are in open position. For example, referring to Fig. 1, if a work piece is fed to the gripper die 68 and 70 at the point 72, thence cut off and transferred to the first or roughing work station 74 by the closing movement of the moving gripper die 68, the transfer fingers 46 and 48 will after the roughing operation grip the work piece at 74 and transfer it to the finishing work station at 75 in the case of a two-high die as illustrated.

Figure 3:
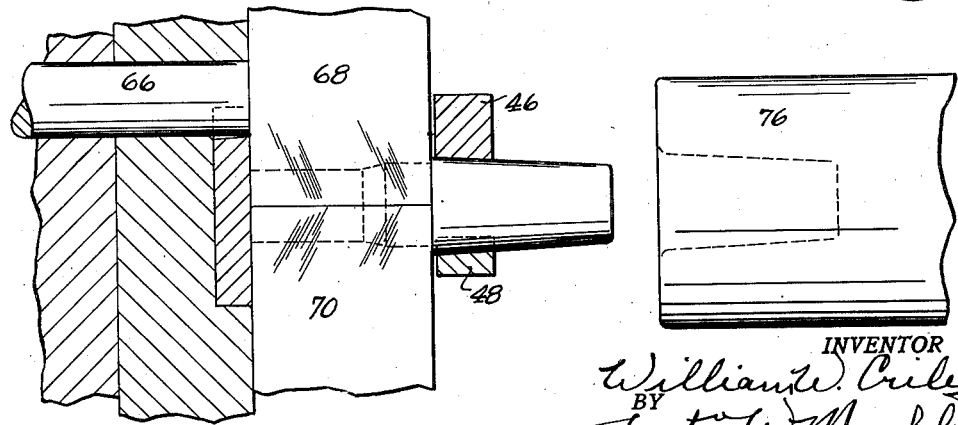
Fig. 3 is a fragmentary enlarged view of transfer fingers gripping an upset portion of a blank.

In the manufacture of short forged or upset articles there is very little room in which to grip the shank of the work piece being operated upon and the transfer fingers 46 and 48 may therefore be placed in the space between a heading tool 76 and the gripper dies 68 and 70, so that the work piece is gripped on the upset portion thereof, such as is shown in Fig. 3. The fingers 46 and 48 therefore move laterally and vertically across the face of the gripper dies adjacent to and in a plane normal to the direction of movement of the heading tool 76.

In Fig. 4 it is to be noted that the transfer fingers 46 and 48 are shown as open far enough to permit entry therebetween of the heading tool 76 during the upsetting or forging operation of the blank, the actuating cams for the fingers being adapted to cause this separation. This is an important feature of the invention.

Operation of the cam mechanism in timed relation with the heading ram therefore provides for the transfer of a work piece from the initial or roughing die stage at 74 to a finishing die stage at 75 and thereafter the transfer fingers are separated a sufficient distance to permit entry therebetween of the heading tool while at the same time the fingers move downwardly and in position to grip a subsequent blank in the initial or first die stage upon the withdrawal of the heading tool. Such coaction of the parts eliminates lost motion and permits of higher operating speeds of the forging machine.

The fingers may be so shaped as to readily grip the upset portion of the work piece, as is indicated in Figs. 3 and 4. Where the finished work piece is also gripped by the fingers the fingers may be provided with upper and lower notches conforming to the contour of the upset portion to be gripped. For example, in a two-high die as indicated in Fig. 5 the lower notches in the fingers would be adapted to grip the conical shaped upset portion shown in the lower part of this figure and the upper notches would be shaped to grip the head portion shown in the upper part of this figure. It will of course be obvious that if more than two-high dies are used additional notches may be provided in the fingers and the mechanism actuating the fingers adapted to cause the proper upward travel of the fingers accordingly.

It is well known that in the forging of work blanks fins or extruded portions are formed along the meeting line of the gripper dies and I will now describe a mechanism for preventing this formation.

Referring first to Fig. 6, there is shown a pair of transfer fingers 80 and 82 held by supporting arms 84 and 86, respectively, in the manner heretofore described, and having curved extremities 88 and 90, respectively, in which are disposed blank engaging and turning jaws or lugs 92 and 94. The jaw 92 has a neck portion 96 connecting with an actuating arm 98 which is pivotally connected with an actuating rod 100 connected with a rocker arm 102 pivoted at 104, this pivot being rigidly supported from the raising and lowering arm 52 heretofore described.

Similarly, the blank engaging and turning jaw 94 has a neck portion 106 connecting with an arm 108 also pivotally connected with an actuating rod 110, likewise connected with the rocker arm 102. The neck portions 96 and 106 of the two blank engaging and turning jaws interfit with slots 112 and 114 in the curved portions 88 and 90 of the two transfer fingers, so as to permit a sliding movement of the lug members in the finger ends, as will be apparent from the illustration shown.

The rocker arm 102 may have a threaded pin member 116 pivotally connected therewith and passing upwardly through a slot 118 in a rigid arm 120, which arm may be secured to and projecting from any portion of the machine with which the transfer mechanism is associated. On the threaded pin 116 are nuts 122 which may be disposed along the pin 116 and locked in position so as to limit the vertical movement of the pin.

It will thus be seen that as the raising and lowering arm 52 raises the fingers 80 and 82 that the lower nuts 122 may engage the arm 120, thereby causing a downward movement of the actuating rod 100 and an upward movement of the actuating rod 110, in which case a blank held between the jaws 92 and 94 will be caused to turn about its center. When the fingers are lowered the upper nuts 122 engage the arm 120 and cause the jaws to move in a reverse direction. It will be further obvious that since this turning operation takes place during the transfer of a blank between work stations a fin formed in one work station will be entirely forged away in a subsequent work station.

In Fig. 7 I have shown in detail one form that the blank engaging and turning jaws may take. This jaw may be provided with a slight projecting intermediate portion 124 which may inter-fit a coacting slot in the finger extremities to insure of a smoother and more positive action of the lug during movement thereof.

In Fig. 8 is shown another form of blank turning mechanism. A blank engaging and turning jaw 126 may be pivoted in the end of a transfer finger 128, as at 130, and have one end thereof pivotally connected as at 132 to an actuating rod 134. The other transfer finger 136 is preferably shaped as at 138 to permit of an arcuate movement of a blank held between the fingers when the turning and engaging jaw 126 is actuated by upward and downward movement of the actuating rod 134. The rod 134 may be actuated in the manner described in connection with Fig. 6 or a separate actuating means may be used.

Another form of turning mechanism is illustrated in Figs. 9 and 10. As there shown, one finger 137 may have an engaging and turning jaw 139 disposed in its end in a slot 140, tongued at 141, and connecting with a lug element 142 in which is rigidly disposed a pin 144. The pin 144 may project into a recess 146, in the adjacent face of a gripper die 145, the length and width of which may be as diagrammatically indicated by the lines 148 in Fig. 10. It will be obvious from these two figures that when the transfer fingers are raised pin 144 will engage with the upper side of the recess 146 and thus cause the blank to be rotated clockwise through a small angle. When the fingers are moved downwardly the pin will engage with the lower side of the recess 146 and thus cause the blank engaging and turning jaw 139 to be moved to its uppermost position as shown in the lower or solid line view of Fig. 10.

It is to be understood that the blank turning mechanism just described may be used in connection with transfer mechanism of the character illustrated in Figs. 1 and 2, that is, with fingers adapted to have a heading tool pass in between, or with an ordinary type of transfer mechanism, that is with fingers adapted to grip the shank of a blank. Also, it is to be understood that in all of the embodiments of this invention illustrated I may transfer blanks from the top toward the bottom or from the bottom toward the top, and I do not wish to be limited to any direction of transfer. Such is made possible by the use of mutually pivoted transfer fingers arranged so that blanks are always transferred substantially toward or away from the mutual pivot. I therefore consider this arrangement novel and of importance.

Other embodiments apparent to those skilled in the art are intended to be included within the spirit and scope of the appended claims.

I claim:

1. In an upsetting machine the combination of a pair of gripper dies having work stations, a heading tool coacting with said dies, opening and closing transfer fingers for transferring work pieces between said stations and means independent of the heading tool for moving the fingers to the open position, said heading tool moving in between said fingers when said fingers are in their open position.

2. In an upsetting machine, the combination of a pair of gripper dies having a plurality of die stages, a heading tool adapted to move toward and away from said dies, transfer fingers for transferring work pieces between said die stages, and means independent of the heading tool for moving the fingers to an open position, said means being adapted to open said fingers when said heading tool is moving toward said dies to permit the heading tool to move between the fingers.

3. In a metal working machine, the combination of a pair of gripper dies, a heading tool coacting with said dies, transfer fingers between said dies and tool, means independent of said heading tool and operable to open said fingers when said heading tool is moving toward said dies to permit the tool to move between the fingers, said means causing said fingers when open to move in a plane normal to the direction of movement of said heading tool.

4. The combination of a pair of gripper dies having roughing and finishing work stations, a heading tool coacting with said dies, transfer fingers between said dies and tool, and means independent of the heading tool whereby said fingers transfer a blank from said roughing station to said finishing station and thereafter open to permit said heading tool to pass between said fingers while said fingers are returning toward said roughing station.

5. The combination of gripping dies, a reciprocating heading tool, said dies presenting a plane face adjacent said heading tool, transfer fingers adapted to move across and adjacent said face, and means independent of the heading tool for causing said fingers to open when said heading tool is moving toward said dies to permit the tool to move between the fingers.

6. The combination of a pair of gripper dies having a plurality of die stages, a recess in the front face of one die, transfer fingers cooperating with said dies, a blank turning jaw associated with and movable relative to one of said fingers, and means associated with said jaw and coacting with said recess for actuating said jaw during movement of said fingers.

7. The combination of a pair of gripper dies having a plurality of die stages, a recess in the front face of one die, transfer fingers cooperating with said dies, a blank turning lug in the end of one of said fingers and movable relative thereto, and a pin on said lug projecting into said recess for actuating said lug during movement of said fingers.

8. In an upsetting machine the combination of a pair of gripper dies having work stations, a heading tool coacting with said dies, and blank turning and transfer fingers for transferring workpieces between said stations the fingers being movable between open and closed positions, said heading ram acting between said fingers when said fingers are in their open position.

9. In a machine of the class described, a die having a plurality of blank receiving apertures therein, transfer means for transferring work blanks from one of said blank receiving apertures to another, said means comprising a pair of fingers having a common moving support, means for moving the support, means for turning a work blank held by said fingers about its axis, said means comprising a movable member associated with one of said fingers and adapted to engage a blank to be turned, an arm pivotally mounted on said common moving support, a link connecting said arm and the movable member associated with the finger, and a member pivotally connected with the arm at a point spaced from the axis on which the arm is pivoted on the moving member, said member being operably connected to a stationary portion of the machine whereby on movement of the finger the movable member is moved relative to the finger.

10. In a machine of the class described, a die having a plurality of blank receiving apertures therein, transfer means for transferring work blanks from one of said blank receiving apertures to another, said means comprising a pair of fingers having a common moving support, means for moving the support, means for turning a work blank held by said fingers about its axis, said means comprising a pair of movable members associated with the fingers and adapted to engage a blank to be turned, each of the fingers having a movable member associated therewith, an arm pivotally mounted on said common moving support, links connecting the movable members with opposite ends of said arm, and a member operably connected with a stationary portion of the machine and pivotally connected with said arm at a point spaced from the axis on which the arm pivots, whereby the movable members associated with the fingers are moved when the common moving support is moved.

11. In a machine of the class described, a die having a plurality of blank receiving apertures therein, transfer means for transferring work blanks from one of said blank receiving apertures to another of said apertures, said means comprising a pair of fingers having a common moving support, means for moving said support, means for turning a work blank held by said fingers about its center, said means comprising a pair of movable members adapted to engage a work blank to be transferred, the movable members being movable in an arcuate path having a center substantially at the center of the blank to be turned, and means for moving the movable members, said means comprising an arm pivotally connected to the common moving support, links connecting the movable members to said arm on opposite sides of the axis on which the arm is pivoted, and a member pivotally connected to the arm at a point spaced from the axis on which the arm pivots, said member being secured to a stationary portion of the machine, whereby movement of the common moving support effects movement of the arm and of the movable members engageable with the work blanks.

WILLIAM W. CRILEY.